Aug. 19, 1969  C. E. WINTERS  3,462,308
METHOD AND MEANS FOR FLOWING A GAS IN A FUEL CELL SYSTEM
Filed Nov. 7, 1967

INVENTOR.
CHARLES E. WINTERS
BY Harrie M. Humphreys
ATTORNEY

United States Patent Office 3,462,308
Patented Aug. 19, 1969

3,462,308
METHOD AND MEANS FOR FLOWING A GAS IN A FUEL CELL SYSTEM
Charles E. Winters, Middleburg Heights, Ohio, assignor to Union Carbide Corporation, a corporation of New York
Continuation-in-part of application Ser. No. 339,158, Jan. 21, 1964. This application Nov. 7, 1967, Ser. No. 691,085
Int. Cl. H01m 27/12
U.S. Cl. 136—86
11 Claims

ABSTRACT OF THE DISCLOSURE

Relates to apparatus, including an aspirator type pump, for flowing gas in a closed fuel cell electrode system at a flow rate which varies with the power output of the fuel cell.

---

This application is a continuation-in-part of application Ser. No. 339,158, filed Jan. 21, 1964, and now abandoned.

This invention relates to a fuel cell system. More specifically, this invention relates to an improved method and means for flowing a gas in contact with the gas surfaces of the electrodes in a fuel cell.

A fuel cell can be considered as a primary galvanic cell, the basic reaction of which is the electrochemical oxidation of a fuel. Fuel cells, however, differ from ordinary primary cells, such as the Le Clanche dry cell, in that the fuel and oxidant are generally introduced continuously into the cell electrodes during production of electricity. Because of this feature, the electrodes and electrolyte in a fuel cell should, within certain limits, remain unchanged while the fuel and oxidant react electrochemically and the electricity produced and the product of this reaction are removed from the cell.

Although fuel cells have been known for over a century, active research is still being conducted in an effort to find ways to increase the efficiency with respect to electrical output of these cells in order to render them commercially feasible.

One approach to increasing the efficiency of fuel cells has been to provide for the rapid removal from the electrodes of the product of the reaction between a fuel and oxidant in order that that the gas composition and electrolyte remain unchanged during the electrochemical reaction. Where the reaction product is water, this has been accomplished by flowing in contact with the gas surfaces of the electrodes in a fuel cell a larger amount of gas than is consumed in the production of electricity. In this manner, water vapor is carried away from the electrodes by the extra gas flowing in contact with the electrodes and is subsequently removed from the gas by, for instance, a condenser maintained at a temperature, for example, 20° C., lower than the normal operating temperature, for example 60° C., of a fuel cell. After the removal of water vapor, the gas is recycled and again flowed in contact with the gas surfaces of the electrodes. However, it has been found that this method of removing a reaction product suffers from a serious drawback in that it undesirably reduces the electrical or power output of the system. This is due to the fact that a motive force must be applied to a gas to cause it to flow in contact with the electrodes and to recycle, in other words, to continuously circulate. Heretofore, this has generally been accomplished by means of various fluid pumps driven by motors which run on electricity produced by the fuel cell or from an independent current source. An alternate method proposed for continuously circulating and removing water from a fuel cell gas has been to use a water powered injector. By means of a conventional water pump, cold water is sprayed from an injector and is mixed with warm humid gas from a fuel cell causing the water carried therein to condense and the gas to circulate by virtue of a pressure differential created by the water spray. Here again, electricity from the fuel cell or from an independent current source is required to run the motor that drives the water pump. These arrangements then have been unsatisfactory because they lower the overall efficiency of a fuel cell system. Another drawback stems from the pumps and motors employed. Because each of these have several moving parts, they of necessity require care and maintenance of a type that is not generally required for the remainder of the fuel cell system which has no moving parts. Again this results in a drain on the overall efficiency of the fuel cell system.

It is, therefore, the principal object of the present invention to provide a method and means for flowing a gas in contact with the gas surfaces of the electrodes in a fuel cell without lowering the electrical efficiency of the fuel cell system.

It is another equally important object of the present invention to provide a fuel cell system having no moving parts hence requiring only a minimum of care and maintenance for maximum overall efficiency of operation.

It is yet another object of the present invention to provide a method and means for flowing a gas in a fuel cell system which utilizes the energy possessed by a compressed gas which is fed into a fuel cell system for purposes of operating a fuel cell.

As exemplary of the present invention and for purposes of simplification only, the description which follows is in reference to a well known fuel cell comprised of porous carbon electrodes having a potassium hydroxide electrolyte therebetween and utilizing hydrogen as the fuel gas and oxygen as the oxidant. It is to be understood that the present invention is equally applicable to other fuel cell systems well known in the art as is more fully discussed below. The term "gas" as used herein and in the appended claims refers to a gas suitable for use in a fuel cell and is meant to encompass both fuel gases and oxidizing gases.

The present invention will be more fully understood from the following description taken in conjunction with the accompanying drawing wherein.

Figure 1:
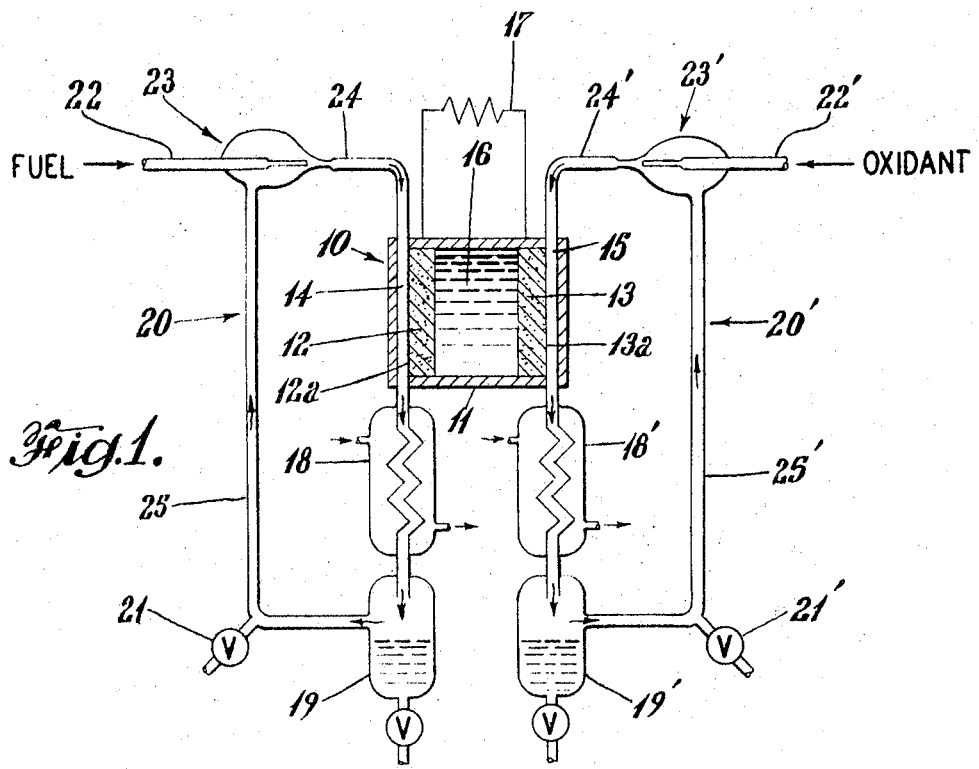
FIGURE 1 is a schematic showing of the preferred embodiment of the means of the present invention suitable for carrying out the method of the present invention.

Broadly, the present invention provides an improved method and means for flowing a gas in contact with the gas surfaces of the electrodes in a fuel cell which utilizes the energy possessed by a compressed gas which is fed into a fuel cell system for purposes of operating a fuel cell. A compressed gas is one which is under a higher pressure than that of a gas flowing in a fuel cell system. According to the present invention, this is accomplished by injecting a gas initially under high pressure by means of a gas jet into a closed gas conduit which is in communication with the gas supply side of a fuel cell electrode. The gas supply side of a fuel cell electrode is more fully described below. The injected gas expands in the gas conduit and thereby imparts an impulse to the gas in the conduit. This impulse, together with the drop in pressure in the gas conduit caused by the gas jet at the point of injection, causes the gas in the closed gas conduit to flow or circulate. According to the preferred embodiment of the present invention, a gas initially under high pressure is fed by means of a gas jet into a zone of limiting cross-sectional area in a closed gas conduit which is in communication with the gas supply side of a fuel cell electrode. From the zone of limiting cross-sectional area, the gas is forced into a zone of increasing cross-sectional area in the gas conduit where the gas from the gas jet expands to a pressure less than its initial pressure. The expanding gas imparts an impulse to the gas in the conduit which, together with the aspiration effect created in the gas conduit by the high velocity feed gas, causes the gas in the closed gas conduit to continuously flow or circulate. Stated in different terms, the present invention utilizes the potential energy possessed by a gas under pressure by converting this potential energy into kinetic or velocity energy which is imparted to a gas in a fuel cell system. Thus it can be said a gas which is caused to flow according to the present invention itself supplies the force necessary to flow the gas in a fuel cell system. It can be seen then that the present invention can be carried out without need of a separate motive source which would reduce the power available from a fuel cell system and as such possesses considerable advantages heretofore unknown to the art.

The apparatus of the present invention can also be defined as a fuel cell system adapted to convert directly the reaction of an oxidizing gas and a fuel gas into electricity, which system includes at least two electrodes each having a gas surface and a gas passage adjacent thereto, and an electrolyte in electrochemical relationship with these electrodes, and improved means for flowing gas in contact with the gas surface of at least one of these electrodes which means comprises: a gas conduit having one end connected to the gas inlet end of the gas passageway and the other end connected to the gas outlet end of the gas passageway, the gas conduit and gas passageway forming a closed system; gas inlet means disposed within the conduit and positioned to direct the flow of gas toward the inlet end of the gas passageway; a first zone of limiting cross-sectional area in the conduit adjacent the gas inlet means and between the gas inlet means and the inlet end of the gas passageway; a second zone of increasing cross-sectional area from the first zone in the conduit adjacent the first zone and between the first zone and the inlet end of the gas passageway; whereby gas fed into the conduit from the gas inlet means creates a zone of reduced pressure in the conduit between the outlet end of the gas passageway and the gas inlet means, and gas expanding from the first zone into the second zone imparts velocity energy to the gas in the conduit thereby causing the gas to flow in the conduit, in the gas passageway, and in contact with the gas surface of the electrode.

In a preferred form of the invention the fuel cell electrolyte is a liquid electrolyte and the operating temperature of the fuel cell is below the normal boiling point of the electrolyte. The invention is particularly effective in hydrogen-oxygen or hydrogen-air fuel cells which employ aqueous electrolytes, because the principal product of the electrochemical reaction is water which collects in and around the hydrogen electrode. When such a fuel cell is operated at temperatures at or above the normal boiling point of the aqueous electrolyte, a great deal of water vapor is produced by evaporation or boiling rather than merely by the electrochemical reaction. This excess of water produced by evaporation places a great burden on the gas circulating system in removing it, which is the principal reason why many prior art devices have found it necessary to employ large volume pumps and large volumes of circulating gas.

When such a hydrogen-oxygen (or air) fuel cell having an aqueous electrolyte is operated below the normal boiling point of the electrolyte and preferably at about 70° C., most of the water which forms in and around the electrodes, particularly the hydrogen electrode, is produced by the electrochemical reaction. Under these conditions, the method and apparatus of this invention is exceptionally efficient in removing this water, because the volume of hydrogen and oxygen (or air) which is required for the electrochemical reaction increases with the power output of the fuel cell. This means that as the power output of the fuel cell increases and more water is produced in the electrochemical reaction, there is a corresponding increase in the amount of gas which is fed into the electrode system by the method and apparatus of this invention and in the amount of gas which is circulated and recirculated throughout the electrode system. Thus, the method and apparatus of this invention has the built-in advantage of increasing the circulation of gas automatically with an increase in the consumption of fuel and oxidant gas and the accompanying increase in water output of the fuel cell.

This advantage of the present invention should be contrasted with prior art methods in which the pumping means operated at a more or less constant speed or which would have required complicated electro-mechanical systems for varying the speed of mechanical pumps in response to changes in the power output level of the fuel cell.

Referring now to the drawing, and specifically to FIGURE 1, a fuel cell is indicated generally by the reference numeral 10 and is shown to include a suitable housing 11, a porous carbon anode 12 having a gas surface 12a, a porous carbon cathode 13 having a gas surface 13a, a potassium hydroxide electrolyte 16, a gas passageway 14 adjacent anode 12 for purposes of permitting a fuel gas to flow therethrough in contact with gas surface 12a, and a similar gas passageway 15 adjacent cathode 13 for purposes of permitting an oxidant gas to flow therethrough in contact with gas surface 13a. The gas passageways 14 and 15 are sometimes termed the gas supply sides of fuel cell electrodes. Electrical current generated by the cell 10 is passed through an external load circuit 17 electrically connected to anode 12 and cathode 13. A closed gas conduit in communication with gas passageway 14 and indicated generally by the reference numeral 20 is provided on the anode side of cell 10. A similar gas conduit 20' in communication with gas passageway 15 is provided on the cathode side of cell 10. Gas conduits 20 and 20' are shown to include chambers generally indicated at 23 and 23', and zones 24 and 24' leading from chambers 23 and 23' to gas passageways 14 and 15 respectively. The remaining portion of gas conduits 20 and 20' leading from the gas passageways of cell 10 to the chambers 23 and 23', numbered 25 and 25' in FIGURE 1, are termed recycle zones. The recycle zones 25 and 25' are provided with condensers 18 and 18' for removing water vapor carried by a gas from the electrodes 12 and 13. Reservoirs 19 and 19' are also conveniently provided for collecting condensed water removed from a gas. It is to be understood that other well known means for removing water vapor from a gas can be used in place of condensers 18 and 18'. Exemplary of such other means are solid adsorbents such as calcium chloride, silica gel, activated charcoal, molecular sieves and the like. Among suitable molecular sieves are those described in U.S. Patents 2,882,243 and 2,882,244 to Milton, issued Apr. 14, 1959, which are incorporated herein by reference. Vent valves 21 and 21' are conveniently provided for periodically purging a gas flowing through conduits 20 and 20' of accumulated inerts.

Figure 2:
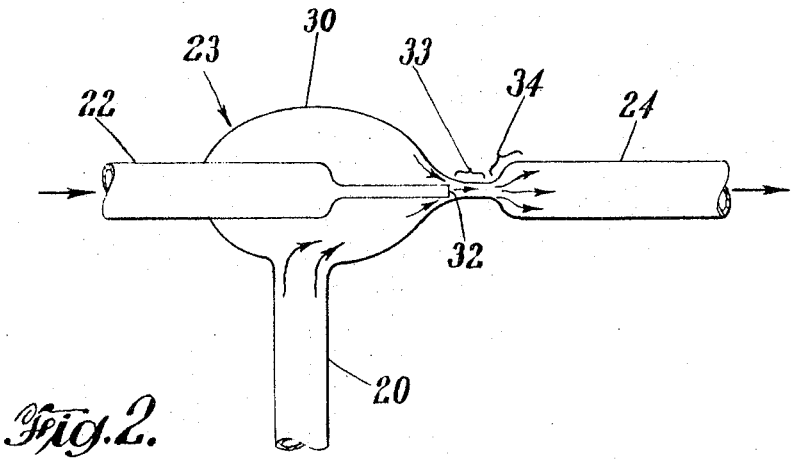
FIGURE 2 is an enlarged view of a portion of the means shown in FIGURE 1.

Referring now to FIGURE 2, there is shown an enlarged view of chamber 23 shown in FIGURE 1. Chamber 23 is shown to include a casing 30, a feed pipe 22 extending into chamber 23 and tapering down to form a gas jet 32 at its end which lies adjacent to zone 33 of limiting cross-sectional area. Adjacent to zone 33 is zone 34 of increasing cross-sectional area from zone 33 and adjacent to it is zone 24 of greater cross-sectional area than zone 33. Zones 33 and 34 form what is generally known as a venturi throat. The shape of casing 30 is not limited to that shown in FIGURE 2. Casing 30 may be of any size or shape desired which will function as described below.

Operation of the fuel cell shown in FIGURES 1 and 2, with respect to the anode side of fuel cell 10 is as follows; hydrogen gas initially under high pressure is fed from a convenient source through feed pipe 22 and exits from gas jet 32. The hydrogen is forced into zone 33 and then into zone 34 where it expands to a pressure less than the initial pressure as is indicated by the arrows in FIGURE 2. The velocity energy released by the incoming hydrogen gas expansion is imparted to the hydrogen in gas conduit 20. When hydrogen gas exits from gas jet 32 at a relatively high velocity, it creates an aspiration effect in chamber 23. Stated in different terms, the high velocity hydrogen gas exiting from gas jet 32 into zone 33 acts like a suction pump by creating a zone of reduced pressure in chamber 23.

The velocity energy imparted to the hydrogen in gas conduit 20 together with the aspiration effect created by the gas jet causes the hydrogen to flow through zone 24, gas passageway 14 at the same time contacting gas surface 12a of anode 12, through condenser 18, and to recycle through zone 25 into chamber 23 and out through zone 33 as is indicated by the arrows in FIGURE 2.

For purposes of the present invention, it is preferred that substantially all the water formed at electrode 12 be removed in order to maintain peak efficiency of fuel cell 10. Water is formed at electrode 12 by the electrochemical reaction of fuel and oxidant and by vaporization from gas surface 12a. According to the present invention, this can be accomplished by flowing through gas passageway 14 from about 5 to about 20 times the amount of gas consumed in the production of electricity. By means of a suitable circulating heat exchange fluid, condenser 18 is maintained at a temperature lower than the operating temperature of fuel cell 10 and is regulated so that a substantial portion, preferably substantially all, of the water vapor is removed from a gas passing therethrough and is deposited in reservoir 19 where it may be conveniently removed. Operation of the cathode side of fuel cell 10 with oxygen gas is the same as than given above for the anode side. At the cathode side, however, water carried by the oxygen is the result of vaporization from gas surface 13a, and not the electrochemical reaction of fuel and oxidant.

The pressure of a gas flowing in a fuel cell system is not necessarily critical but is governed by practical considerations such as electrode structure and porosity. For example, the pressure of a gas should not be so high as to undesirably force a gas through a porous electrode. In general, pressures which are employed in commonly used fuel cells range from about 1 p.s.i.g. to about 5 p.s.i.g. and can be as high as 10 p.s.i.g. The pressure of a gas fed into a fuel cell system is similarly not critical but is governed by practical considerations such as the size and capability of a fuel cell system, the amount of gas flowing therein, and the quantity of gas consumed in the electrochemical production of electricity. For example, according to the present invention feed gas pressure should not be so low, generally not less than 10 p.s.i.g., such that the efficiency of the method and means of the present invention are materially affected. In general, feed gas pressures ranging from about 10 p.s.i.g. to about 50 p.s.i.g. are normally employed in carrying out the present invention.

As an example of the present invention, a fuel cell similar to that shown in FIGURE 1 was operated at a temperature of 50° C. The electrolyte used as 9 N potassium hydroxide, and the electrodes were porous plates of carbon. Dry hydrogen gas under a pressure of 15 p.s.i.g. was fed at a rate of 0.3–0.5 ft.$^3$/hr. through feed pipe 22 and into zone 33 by way of gas jet 32. The hydrogen was then expanded in zone 34 to a pressure of 1 p.s.i.g. The velocity energy imparted by the expanding hydrogen together with the aspiration effect of gas jet 32 caused the hydrogen to flow through zone 24, gas passageway 14 at the same time contacting gas surface 12a of anode 12, condenser 18, recycle zone 25 and chamber 23 at a rate of 6–8 ft.$^3$/hr. The pressure of the hydrogen in recycle zone 25 just below chamber 23 was ½ p.s.i.g. which was caused by the aspiration effect of gas jet 32. The amount of hydrogen flowed through gas passageway 14 was about 10 times the amount of hydrogen consumed at anode 12 in the production of electricity and was sufficient to remove water vapor from anode 12 so that the electrolyte remained substantially invariant. Water vapor carried by the hydrogen was removed by condensing the same in condenser 18 maintained at 15° C. by circulating cool water, and was deposited in reservoir 19. Dry oxygen gas was flowed through gas passageway 15 in contact with gas surface 13a of cathode 13 in the same manner as described for hydrogen. The fuel cell so operated produced a current density of 50 amps/ft.$^2$. A similar fuel cell system using instead a gas pump to flow the gases could require up to about 20% of the electricity produced by the fuel cell to run the motor to drive the pump. The method and means of the present invention then realize an important saving in electrical energy, and are particularly adaptable for use in small, portable fuel cell systems.

A similar hydrogen-oxygen fuel cell employing a potassium hydroxide electrolyte and operating at a temperature of about 70° C. was operated at power levels up to one kilowatt, and the amount of hydrogen gas recirculated in the hydrogen electrode system (an apparatus of this invention) was measured. "Hydrogen recirculation rate" is defined as the amount of hydrogen circulated through the gas conduits of the electrode system over and above the amount of hydrogen consumed by the electrode. The data obtained is summarized in the following table:

| Fuel cell power output (kilowatts) | Hydrgoen recirculation rate (pounds per hour) |
| --- | --- |
| 0 | 0 |
| 0.2 | 0.5 |
| 0.4 | 0.74 |
| 0.6 | 0.93 |
| 0.8 | 1.09 |
| 1.0 | 1.25 |

From these data it is apparent that the hydrogen recirculation rate increases with fuel cell power output. This in turn increases the amount of water removed from the cell, at least partially balancing the increased electrochemical water formation. In this same experiment it was found that the electrolyte concentration remained within the normally useful and acceptable limits. This would not have occurred if the hydrogen (and oxygen) recirculation rates had remained constant as typically provided by a constant speed mechanical pump. The method and apparatus of the invention thus provide an improved degree of self-regulation not heretofore obtained, and permit operation of the fuel cell over extended periods of time without undesirable accumulation of water in and around the electrode.

It is to be understood that the method and means of the present invention can be employed to continuously or intermittently flow a gas in a fuel cell system. Accordingly, it is within the scope of the present invention to provide means to control and regulate the amount of gas fed into conduits 20 and 20′ and to regulate and maintain the pressure of a gas flowing in conduits 20 and 20′ at a desired level. Ideally, the amount of gas under pressure fed into an operating fuel cell system as disclosed herein should just equal the amount of gas consumed in the electrochemical production of electricity. Where gas in excess of this amount is fed into the system, the pressure builds up in closed conduits 20 and 20′ thereby causing a decrease in the rate of gas flow and even stopping the same when the pressure builds up to a point where it equals the feed pressure. This can be avoided and peak efficiency maintained by proper use of the aforementioned means for controlling the amount of gas under pressure fed into the system and regulating the pressure of a gas flowing in closed conduits 20 and 20'. One simple and efficient means found for regulating the pressure has been to employ vent valves 21 and 21' as bleeder valves to remove excess gas from closed conduits 20 and 20' thereby maintaining the pressure of a gas flowing therein at a desired level.

Gas-permeable, electrolyte-impermeable electrodes suitable for use in the present invention may be made of materials such as nickel, silver, carbon, graphite, activated carbon, mixtures thereof, and the like. Furthermore, suitable electrodes may be treated as disclosed in U.S. Patent 3,077,507, issued Feb. 12, 1963, to Kordesch, which is incorporated herein by reference.

Examples of suitable fuels other than hydrogen are carbon monoxide, vapors of alcohols such as methanol, ethanol, and the like, vapors of hydrocarbons such as cyclohexane, deca and tetrahydronaphthalene, and the like. Suitable oxidants other than oxygen are air, chlorine, and the like. Besides potassium hydroxide, other well known alkaline electrolytes and the like may be employed. It is to be noted that other products besides water which are formed during the electrochemical reaction of a fuel and oxidant may be removed by the method and means of the present invention. It is also within the scope of the present invention to remove other foreign substances or gases not the product of the reaction of a fuel and oxidant which find their way into a gas flowing in a fuel cell system. An example of this is water from vaporization which is carried by the oxygen flowing in a hydrogen-oxygen-potassium hydroxide fuel cell system such as that described above.

It is also to be noted that the method and means of the present invention may be used to flow a gas in one or a battery of fuel cells in a fuel cell system or may be used to flow a gas in contact with the gas surface of only one electrode in a fuel cell.

What is claimed is:

1. In a fuel cell system adapted to directly convert the reaction of an oxidizing gas and a fuel gas into electricity comprising at least one fuel gas electrode and at least one oxidizing gas electrode each having a gas surface and a gas passageway adjacent thereto, and an electrolyte in electrochemical relationship with said electrodes, the improvement for flowing fuel gas in contact with the gas surface of at least one of said fuel gas electrodes which comprises: a gas conduit having one end connected to the gas inlet end of said gas passageway and the other end connected to the gas outlet end of said gas passageway, said gas conduit and said gas passageway forming a closed system; gas inlet means disposed within said conduit, constructed and arranged to permit supply of at least a major amount of the fuel gas flowing in contact with said gas surface, and positioned to direct the flow of gas toward the inlet end of said gas passageway; a first zone of limiting cross-sectional area in said conduit adjacent said gas inlet means and between said gas inlet means and the inlet end of said gas passageway; a second zone of increasing cross-sectional area from said first zone in said conduit adjacent said first zone and between said first zone and the inlet end of said gas passageway; whereby gas fed into said conduit from said gas inlet means creates a zone of reduced pressure in said conduit between the outlet end of said gas passageway and said gas inlet means, and gas expanding from said first zone into said second zone imparts velocity energy to the gas in said conduit thereby causing said gas to flow in said conduit, in said gas passageway, and in contact with the gas surface of said electrode at a rate which varies with the power output of said fuel cell system.

2. The fuel cell system as defined in claim 1 wherein said gas conduit is provided with means for removing the product of the reaction of an oxidizing gas and a fuel gas from the gas flowing in said conduit, said product-removing means being positioned between the outlet end of said gas passageway and said gas inlet means.

3. In a fuel cell system adapted to directly convert the reaction of oxygen gas (or air) and hydrogen gas into electricity comprising at least one hydrogen electrode and at least one oxygen electrode each having a gas surface and a gas passageway adjacent thereto and an aqueous electrolyte in electrochemical relationship with said electrodes, said fuel cell operating at a temperature below the boiling point of said electrolyte, the improvement for flowing hydrogen gas in contact with the gas surface of at least one of said hydrogen electrodes which comprises: a gas conduit having one end connected to the gas inlet end of said gas passageway and the other end connected to the gas outlet end of said gas passageway, said gas conduit and said gas passageway forming a closed system; gas inlet means disposed within said conduit, constructed and arranged to supply at least a major amount of the hydrogen gas flowing in contact with said gas surface, positioned to direct the flow of gas toward the inlet end of said gas passageway, and comprising a jet nozzle of smaller cross-sectional area than said conduit axially aligned with the portion of said conduit surrounding said nozzle; a first zone of limiting cross-sectional area in said conduit adjacent said jet nozzle and between said nozzle and the inlet end of said gas passageway; a second zone of increasing cross-sectional area from said first zone in said conduit adjacent said first zone and between said first zone and the inlet end of said gas passageway; whereby gas fed into said conduit from said gas inlet means creates a zone of reduced pressure in said conduit between the outlet end of said gas passageway and said gas inlet means, and gas expanding from said first zone into said second zone imparts velocity energy to the gas in said conduit thereby causing said gas to flow in said conduit, in said gas passageway, and in contact with the gas surface of said electrode at a rate which varies with the power output of said fuel cell system.

4. The fuel cell system defined in claim 3 wherein said gas conduit is provided with means for removing water from the gas flowing in said conduit, said water removing means being positioned between the outlet end of said gas passageway and said gas inlet means.

5. Method for flowing a gas in a fuel cell system adapted to directly convert the reaction of an oxidizing gas and a fuel gas into electricity, said fuel cell system comprising at least one fuel gas electrode and at least one oxidizing gas electrode each having a gas surface and a gas passageway adjacent thereto, an electrolyte in electrochemical relationship with said electrodes, and at least one of said fuel gas electrodes including a gas conduit having one end connected to the gas inlet end of said gas passageway and the other end connected to the gas outlet end of said gas passageway, said gas conduit and said gas passageway together forming a closed system, said method comprising: maintaining said electrolyte at a temperature below the boiling point thereof; injecting under pressure into said conduit through gas inlet means positioned within said conduit at least a major amount of the fuel gas flowing in contact with said fuel gas electrode gas surface; directing said gas through a first zone of limiting cross-sectional area adjacent said gas inlet means and positioned between said gas inlet means and the inlet end of said gas passageway; expanding said gas into a second zone of increasing cross-sectional area from said first zone, said second zone being located adjacent said first zone and between said first zone and the inlet end of said gas passageway; thereby creating a zone of reduced pressure in said conduit between the outlet end of said gas passageway and said gas inlet means and imparting velocity energy to the gas in said conduit whereby said gas is caused to flow in said conduit, said gas passageway, and in contact with the gas surface of said electrode; and the flow rate of said gas varies with the power output of said fuel cell system.

6. The method as defined in claim 5 wherein the amount of gas flowing through said gas passageway is between about 5 and about 20 times the amount of gas consumed by said electrode in the production of electricity.

7. In a fuel cell system adapted to directly convert the reaction of an oxidizing gas and a fuel gas into electricity comprising at least one fuel gas electrode and at least one oxidizing gas electrode each having a gas surface and a gas passageway adjacent thereto, and an electrolyte in electrochemical relationship with said electrodes, the improvement for flowing oxidizing gas in contact with the gas surface of at least one of said oxidizing gas electrodes which comprises: a gas conduit having one end connected to the gas inlet end of said gas passageway and the other end connected to the gas outlet end of said gas passageway, said gas conduit and said gas passageway forming a closed system; gas inlet means disposed within said conduit, constructed and arranged to permit supply of substantially all the oxidizing gas flowing in contact with said gas surface, and positioned to direct the flow of gas toward the inlet end of said gas passageway; a first zone of limiting cross-sectional area in said conduit adjacent said gas inlet means and between said gas inlet means and the inlet end of said gas passageway; a second zone of increasing cross-sectional area from said first zone in said conduit adjacent said first zone and between said first zone and the inlet end of said gas passageway; whereby gas fed into said conduit from said gas inlet means creates a zone of reduced pressure in said conduit between the outlet end of said gas passageway and said gas inlet means, and gas expanding from said first zone into said second zone imparts velocity energy to the gas in said conduit thereby causing said gas to flow in said conduit, in said gas passageway, and in contact with the gas surface of said electrode at a rate which varies with the power output of said fuel cell system.

8. In a fuel cell system adapted to directly convert the reaction of oxygen gas (or air) and hydrogen gas into electricity comprising at least one hydrogen electrode and at least one oxygen (or air) electrode having a gas surface and a gas passageway adjacent thereto and an aqueous electrolyte in electrochemical relationship with said electrodes, said fuel cell operating at a temperature below the boiling point of said electrolyte, the improvement for flowing oxygen gas (or air) in contact with the gas surface of at least one of said oxygen electrodes which comprises: a gas conduit having one end connected to the gas inlet end of said gas passageway and the other end connected to the gas outlet end of said gas passageway, said gas conduit and said gas passageway forming a closed system; gas inlet means disposed within said conduit, constructed and arranged to supply substantially all the oxygen gas (or air) flowing in contact with said gas surface, positioned to direct the flow of gas toward the inlet end of said gas passageway, and comprising a jet nozzle of smaller cross-sectional area than said conduit axially aligned with the portion of said conduit surrounding said nozzle; a first zone of limiting cross-sectional area in said conduit adjacent said jet nozzle and between said nozzle and the inlet end of said gas passageway; a second zone of increasing cross-sectional area from said first zone in said conduit adjacent said first zone and between said first zone and the inlet end of said gas passageway; whereby gas fed into said conduit from said gas inlet means creates a zone of reduced pressure in said conduit between the outlet end of said gas passageway and said gas inlet means, and gas expanding from said first zone into said second zone imparts velocity energy to the gas in said conduit thereby causing said gas to flow in said conduit, in said gas passageway, and in contact with the gas surface of said electrode at a rate which varies with the power output of said fuel cell system.

9. The fuel cell system defined in claim 8 wherein said gas conduit is provided with means for removing water from the gas flowing in said conduit, said water removing means being positioned between the outlet end of said gas passageway and said gas inlet means.

10. Method for flowing a gas in a fuel cell system adapted to directly convert the reaction of an oxidizing gas and a fuel gas into electricity, said fuel cell system comprising at least one fuel gas electrode and at least one oxidizing gas electrode each having a gas surface and a gas passageway adjacent thereto, an electrolyte in electrochemical relationship with said electrodes, and at least one of said oxidizing gas electrodes including a gas conduit having one end connected to the gas inlet end of said gas passageway and the other end connected to the gas outlet end of said gas passageway, said gas conduit and said gas passageway together forming a closed system, said method comprising: maintaining said electrolyte at a temperature below the boiling point thereof; injecting under pressure into said conduit through gas inlet means positioned within said conduit substantially all of the oxidizing gas flowing in contact with said oxidizing gas electrode gas surface; directing said gas through a first zone of limiting cross-sectional area adjacent said gas inlet means and positioned between said gas inlet means and the inlet end of said gas passageway; expanding said gas into a second zone of increasing cross-sectional area from said first zone, said second zone being located adjacent said first zone and between said first zone and the inlet end of said gas passageway; thereby creating a zone of reduced pressure in said conduit between the outlet end of said gas passageway and said gas inlet means and imparting velocity energy to the gas in said conduit whereby said gas is caused to flow in said conduit, said gas passageway, and in contact with the gas surface of said electrode; and the flow rate of said gas varies with the power output of said fuel cell system.

11. The method as defined in claim 10 wherein the amount of gas flowing through said gas passageway is between about 5 and about 20 times the amount of gas consumed by said electrode in the production of electricity.

References Cited

UNITED STATES PATENTS

| 357,646 | 2/1887 | Upward et al. | 136—86 |
| 550,244 | 11/1895 | Blagburn. | |
| 2,802,337 | 8/1957 | Bunch. | |
| 3,375,139 | 3/1968 | Tschinkel | 136—86 |

OTHER REFERENCES $H_2$-$O_2$ Fuel Cell, A.D. 248, 428, ASTIA, pp. 24, 25, March 1961.

ALLEN B. CURTIS, Primary Examiner